United States Patent [19]

Kanema et al.

[11] Patent Number: 4,958,147
[45] Date of Patent: Sep. 18, 1990

[54] GRAPHIC DISPLAY PROCESSING SYSTEM AND DISPLAYED PATTERN PICKING METHOD USED IN THE SAME

[75] Inventors: Seiichi Kanema, Yokohama; Misato Nio, Hitachi; Yasushi Fukunaga, Hitachi; Takehiko Nishida, Katsuta, all of Japan

[73] Assignee: Hitachi, Ltd., Tokyo, Japan

[21] Appl. No.: 222,848

[22] Filed: Jul. 22, 1988

[30] Foreign Application Priority Data

Jul. 23, 1987 [JP] Japan .................. 62-182324

[51] Int. Cl.$^5$ ................................. G09G 5/00
[52] U.S. Cl. .................................. 340/706; 340/703; 340/729
[58] Field of Search ............. 340/747, 732, 709, 727, 340/706, 701, 703, 721, 729, 723; 364/518, 521; 382/48

[56] References Cited

U.S. PATENT DOCUMENTS

| | | | |
|---|---|---|---|
| 4,491,836 | 1/1985 | Collmeyer et al. | 340/747 |
| 4,642,625 | 2/1987 | Tsuneshiro et al. | 340/747 |
| 4,679,041 | 7/1987 | Fetter et al. | 340/747 |
| 4,808,986 | 2/1989 | Mansfield et al. | 340/732 |
| 4,812,988 | 3/1989 | Duthuit et al. | 340/747 |
| 4,813,013 | 3/1989 | Dunn | 340/747 |
| 4,847,605 | 7/1989 | Callahan et al. | 340/709 |

FOREIGN PATENT DOCUMENTS

52-221887 12/1983 Japan .

Primary Examiner—Jeffery A. Brier
Attorney, Agent, or Firm—Fay, Sharpe, Beall, Fagan, Minnich & McKee

[57] ABSTRACT

A graphic display processing system is disclosed, in which a two-dimensional pattern or an image of a three-dimensional pattern can be displayed on the display screen of a display device, and moreover it can be rapidly judged whether or not each graphic data on a display list formed in a graphic data buffer corresponds to a pattern in a pattern pick region (namely, pick aperture) set on the display screen. In more detail, display color data in the pick aperture is first read out of a frame memory for storing image data. In a case where an image of a three-dimensional pattern is displayed, depth values in the pick aperture are read out of a Z-buffer for storing depth values with respect to a displayed pattern. Next, the read-out display color data is compared with display color commands on the display list, or the read-out depth values are compared with depth values obtained from geometrical form commands on the display list, to check whether or not each graphic data on the display list indicates the same display color or depth value as that of a pattern to be picked, thereby selecting only graphic data which is judged to indicate the same display color or depth value as that of the to-be-picked pattern. Then, it is checked whether or not the selected graphic data indicates a pattern intersecting with the pick aperture. Thus, desired graphic data can be rapidly picked out of the display list.

12 Claims, 3 Drawing Sheets

GRAPHIC DISPLAY PROCESSING SYSTEM AND DISPLAYED PATTERN PICKING METHOD USED IN THE SAME

BACKGROUND OF THE INVENTION

The present invention relates to a displayed-pattern processing method carried out by a graphic processor, and more particularly to a displayed-pattern picking method for picking commands indicative of a pattern to be displayed on a display screen, out of a list stored in a graphic data buffer.

Computer technology has hitherto been used to make a drawing including various patterns such as a design drawing. Accordingly, when such a drawing is made, graphic data indicative of each of unit patterns such as a straight line and a circular arc or a pattern group for forming a combination of unit patterns is applied to and stored in a graphic data buffer. Then, graphic data is read out from the graphic data buffer to display a pattern on a display screen. That is, a desired drawing can be made by inputting graphic data successively to the graphic data buffer, or by modifying graphic data stored in the graphic data buffer.

Graphic data includes a display color command indicative of the color of a displayed pattern or displayed pattern group and a geometrical form command indicative of the geometrical form of the displayed pattern or displayed pattern group. A plurality of graphic data each including the display color command and the geometrical form command are stored in the graphic data buffer in such a manner that the graphic data are arranged so as to form a list (hereinafter referred to as "display list"). The geometrical form command includes data indicative of the characteristic form of a pattern or pattern group (that is, one of a straight line, a circle, a triangle and others), and data indicative of coordinate values representative of the position of the pattern or pattern group in a virtual coordinate system.

As mentioned above, the display list is made in the graphic data buffer. However, it is not always required that a pattern indicated by all the graphic data on the display list is displayed on a display screen, but a pattern displayed on the display screen is determined by a window set in a virtual coordinate system which is formed in the graphic data buffer. That is, a pattern formed by graphic data within the window is displayed in a viewport which is set on the display screen. The window can be formed at a desired position in the virtual coordinate system and can have desired dimensions, and the viewport may be set all over the display screen or at a portion thereof.

The coordinate values of the graphic data within the window with respect to the virtual coordinate system are converted into coordinate values in the viewport with respect to a coordinate system set on the display screen, to convert the graphic data into image data for picture elements on the display screen, and the image data are stored in an image memory such as a frame memory. The image data are successively read out from the image memory, to be sent to a display device, and thus a pattern corresponding to graphic data within the window is displayed in the viewport on the display screen of the display device.

In some cases, it is required to modify a portion of a drawing in a period when the drawing is being made, or after the drawing has been made. In the above cases, that position on the display screen which indicates a pattern portion to be modified, is specified by a position mark such as a cursor, and graphic data indicative of the pattern portion specified by the position mark is picked out of the display list. The picked graphic data is subjected to processing for modification of pattern.

In a conventional graphic processor, graphic data within the window is read out from the graphic data buffer, to be converted into image data for displaying a pattern. That is, the read-out graphic data is not preserved. Accordingly, in order to pick graphic data corresponding to the position mark, it is required to read out graphic data successively from the display list in the graphic data buffer and to judge whether or not the graphic data is within a pattern pick region (namely, pick aperture) specified by the position mark. Thus, the amount of processing necessary for picking desired graphic data is greatly increased, and a long processing time is needed.

An example of a method of obtaining desired graphic data rapidly is disclosed in a Japanese patent application JP-A-No. 58-221,887. This method relates to an operation for picking graphic data within a window. In more detail, a minimum rectangular region including a pattern which corresponds to graphic data, is formed for each graphic data, and it is checked by a simple comparing operation whether or not at least a portion of the rectangular region intersects with the window, to pick graphic data roughly. Only the data corresponding to graphic data indicative of the rectangular region which intersects with the window is checked. This method is applicable to a pick aperture. According to this method, it is not required to check out all graphic data, and hence a desired pattern portion can be rapidly extracted.

In this method, however, it is required to calculate data indicative of a minimum rectangular region including a pattern due to each graphic data, and a memory for storing the calculated data is required. Further, the amount of processing necessary for extracting a desired pattern portion is reduced, as compared with a case where all graphic data are checked as to whether or not each graphic data indicates a picture element within a pick aperture. However, each of minimum rectangular regions specified by all graphic data is compared with the window, and hence it is impossible to reduce the amount of processing greatly.

SUMMARY OF THE INVENTION

It is a first object of the present invention to provide a displayed-pattern picking method which can pick desired graphic data rapidly out of a graphic data buffer, without using additional data such as a minimum rectangular region.

It is a second object of the present invention to provide a displayed-pattern picking method which can greatly reduce the number of graphic data which are checked as to whether or not each graphic data corresponds to a picture element in a pick aperture, to extract a desired pattern portion very rapidly.

It is a third object of the present invention to provide a graphic display processing system capable of rapidly displaying a modified version of a portion of a pattern displayed on a display screen.

In order to attain the first and second objects, according to an aspect of the present invention, there is provided a displayed-pattern picking method, in which when a pick aperture is set, display color data in the pick aperture is read out of an image data, or depth values in the pick aperture are read out of a Z-buffer for storing the depth value of each point of a pattern to be displayed, the read-out display color data is compared with display color commands stored in the graphic data buffer, or the read-out depth values are compared with depth values of geometrical form commands stored in the graphic data buffer, to pick graphic data indicative of a pattern to be extracted.

Further, in order to attain the third object, according to another aspect of the present invention, there is provided a graphic display processing system capable of displaying a pattern on the display screen of display means, setting a pattern pick region on the display screen, and displaying one of modified versions of a pattern displayed in the pattern pick region which system comprises: graphic data buffer means for storing therein a display list made up of command groups each defining the geometrical form and display color of a pattern; storage means for storing therein display data with respect to each of picture elements displayed by the display means; a graphic processor for reading out the display list from the graphic data buffer means to calculate display data corresponding to each graphic data within a specified window and to write the calculated display data in the storage means, the graphic processor including means for reading out display data shown in a pattern pick region set on the display screen to make a picked display data list, means for reading out the display list from the graphic data buffer means to compare each graphic data on the display list with the display data on the picked data list, and means for checking only commands selected by the comparison means, as to whether or not each of the selected commands corresponds to a pattern in the pattern pick region; input means for setting the pattern pick region on the display screen; and control means for controlling the graphic data buffer means, the storage means, the graphic processor, and the input means.

Information on display color read out of an image memory such as a frame memory is compared with the display color of a pattern read out of the display list. In a case where the display color read out of the image memory is different from the display color of the pattern read out of the display list, it is judged that the pattern is not a to-be-extracted pattern, without checking the geometrical form of the pattern. Thus, a pattern which should not be extracted can be rapidly determined.

Information on depth value read out of the Z-buffer is compared with the depth values of a pattern read out of the display list. In a case where a maximum depth value read out of the display list is smaller than a minimum depth value read out of the Z-buffer, or a minimum depth value read out of the display list is greater than a maximum depth value read out of the Z-buffer, it is judged that the pattern is not a to-be-extracted pattern, without checking the geometrical form of the pattern in detail. Thus, a pattern which should not be extracted, can be rapidly determined.

In fact, many of graphic data on the display list do not correspond to display data in the pick aperture. Accordingly, by removing graphic data which are not to be picked out of the display list, the to-be-extracted pattern can be rapidly determined.

An invention made by the present inventors and associated with the present invention is disclosed in a Japanese patent application (Application No. 61-245,446) entitled "graphic display device". According to this invention, a flag is set for graphic data within a window which is set in a graphic data buffer. The flag is set after the window for a to-be-displayed pattern has been set, to check whether or not each graphic data lies in the window. By using the flag, only graphic data within the window are checked, as to whether or not each of the graphic data corresponds to a pattern in a pick aperture. That is, by using the flag, the number of graphic data checked as above is reduced and thus the amount of processing is also reduced. However, all graphic data in the window are checked whether or not each of the image data thus obtained is included in a pick aperture. Accordingly, it is impossible to reduce the amount of processing in a great degree.

Incidentally, the above-reffered Japanese patent application JP-A-No. 58-221,887 entieled "graphic display control method" corresponds to a U.S. patent application Ser. No. 505,446 filed in June 1983, but the Japanese patent application (Application No. 61-245,446) does not have a corresponding U.S. patent application.

DESCRIPTION OF THE PREFERRED EMBODIMENTS

Now, explanation will be made of embodiments of the present invention, with reference to the drawings.

Figure 1:
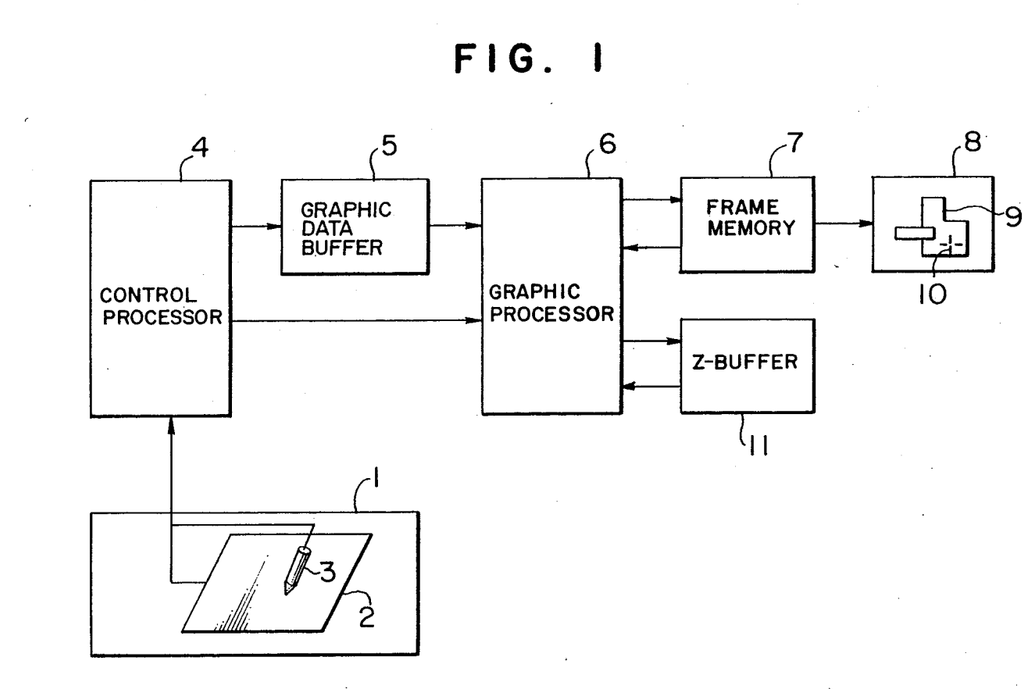
FIG. 1 is a block diagram showing an embodiment of a graphic display processing system according to the present invention.

FIG. 1 is a block diagram showing an embodiment of a graphic display processing system according to the present invention. In FIG. 1, reference numeral 1 designates an input device, 2 a tablet, 3 a stylus pen, 4 a control processor, 5 a graphic data buffer, 6 a graphic processor, 7 a frame memory serving as an image memory, 8 the display screen of a display device, 9 a displayed pattern, 10 a position mark, and 11 a Z-buffer.

Referring to FIG. 1, the input device 1 is used to input a pattern, to display the pattern, and to start a picking operation for the pattern. When a pattern is inputted to the control processor 4 by operating the stylus pen 3 on the tablet 2, the control processor 4 processes input data to produce graphic data made up of a display color command and a geometrical form command. The graphic data is produced each time a pattern is inputted to the control processor 4 by the input device 1, and graphic data thus obtained are used to make a display list. The graphic data are successively written in a memory (not shown), and further applied to the graphic processor 6, to be converted into image data, which are stored in the frame memory 7. Addresses in the frame memory 7 correspond to picture elements in a viewport set on the display screen 8, on a one-to-one basis. The image data read out of the frame memory 7 is sent to the display device, to display a pattern in the viewport.

A pattern is formed and displayed on the display screen 8 in the above-mentioned manner. When a desired pattern has been formed and a predetermined operation is performed, the display list formed by the control processor 4 is sent to the graphic data buffer 5, to be stored therein. A virtual coordinate system is set in the graphic data buffer 5, and the position of each graphic data in the graphic data buffer 5 is expressed by the virtual coordinate system.

When window data is inputted to the control processor 4 by the input device 1, the control processor 4 sends the window data to the graphic data buffer 5, and sets a window which corresponds to a desired area in the viewport on the display screen 8, on the virtual coordinate system in the graphic data buffer 5. Next, display start indicating data is inputted to the control processor 4 by the input device 1, and the control processor 4 sends the display start indicating data to the graphic processor 6. Then, the graphic processor 6 reads out the display list from the graphic data buffer 5, and writes image data which corresponds to graphic data contained in the window or a portion of the graphic data, in the frame memory 7.

In this case, the image data is the display color data, and picture element position data for indicating a pattern displayed in the viewport is made from the geometrical form command of graphic data. The picture element position data is used to specify an address in the frame memory for storing the display color data. Thus, display color data indicative of a color which is to be displayed by a picture element on the display screen 8, is stored in the frame memory 7 at an address corresponding to the picture element on the display screen 8. Image data at all of the addresses corresponding to the viewport on the display screen 8 are successively and repeatedly read out from the frame memory 7, and a video signal corresponding to the readout image data is applied to the display device. Thus, a pattern can be displayed in colors, in the viewport on the display screen 8.

In a case where a two-dimensional pattern is displayed, the pattern can be displayed on the display screen by using the frame memory 7 in the above-mentioned manner. In a case where an image of a three-dimensional pattern is displayed on the display screen, however, the Z-buffer 11 is used in addition to the frame memory 7, and the three-dimensional pattern is displayed by the hidden surface removal method. According to the hidden surface removal method, depth values (namely, Z-values) of three-dimensional patterns are used for checking a positional relation in the direction of depth between three-dimensional patterns, and that portion of a three-dimensional pattern which stands concealed behind another three-dimensional pattern is not displayed. Hence, the depth value of each point on the unhidden surface of each three-dimensional pattern is stored in the Z-buffer 11. Accordingly, the display color data is stored in the frame memory 7 only at addresses corresponding to points whose depth values are stored in the Z-buffer 11. Thus, an image of a three-dimension pattern can be displayed on the display screen 8 in the same manner as viewed in the natural world.

Figure 2:
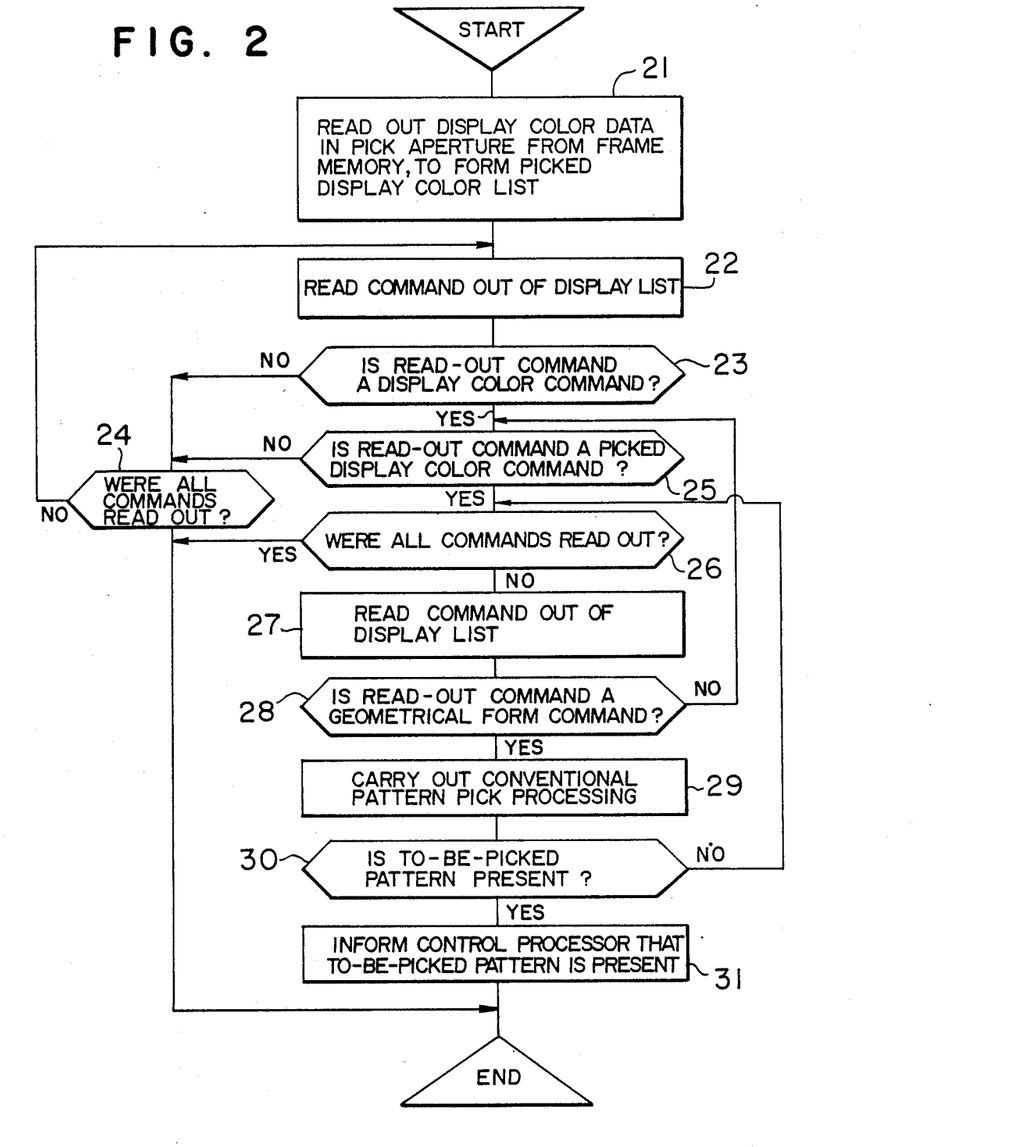
FIG. 2 is a flow chart for explaining an embodiment of a displayed-pattern picking method which is carried out within the system of FIG. 1 in accordance with the present invention.

Next, explanation will be made of an embodiment of a displayed-pattern picking method according to the present invention, that is, a displayed-pattern picking method which is carried out for a two-dimensional pattern by the graphic processor 6, with reference to the flow chart of FIG. 2. When data indicative of a pick aperture (namely, pick aperture data) is inputted to the control processor 4 by the input device 1, the control processor 4 sends the pick aperture data to the graphic processor 6, to convert the pick aperture data into image data, which is sent to the display device. Thus, the position mark 10 is displayed at that position on the display screen 8 which is determined by the pick aperture data. The position of the position mark 10 on the display screen 10 can be changed by performing a predetermined operation on the input device 1. Thus, a pattern to be picked can be specified.

After a pick position on the display screen 8 has been determined, pick start indicating data is inputted to the control processor 4 by the input device 1. The control processor 4 sends the above data to the graphic processor 6. The graphic processor 6 is so formed as to be able to read out display color data from the frame memory 7. Accordingly, when applied with the pick start indicating data, the graphic processor 6 uses the coordinate values of a pick aperture indicated by the position mark 10 as address data, to specify an address in the frame memory 7 by the address data, and reads out display color data from the frame memory 7 at the specified address.

In a case where the pick aperture is specified by the position mark 10 indicative of one point, display color data of that picture element on the display screen 8 which has the same position as the position mark 10, is read out from the frame memory 7. Further, in a case the pick aperture is indicated by the position mark 10 indicative of an area, display color data of a single picture element corresponding to the center of the position mark 10 may be read out from the frame memory 7, or display color data of all picture elements corresponding to the position mark 10 may be read out from the frame memory 7. The display color data which is read out from the frame memory 7 in the above-mentioned manner, will hereinafter be referred to as "picked display color data". The graphic processor 6 makes a list of one or more picked display color data, that is, a picked display color list (step 21 of FIG. 2).

Next, one command is read out of the display list in the graphic data buffer 5 (step 22). Then, it is checked whether or not the read-out command is a display color command (step 23). The display list includes a plurality of graphic data each made up of a display color command and a geometrical form command. Accordingly, the processing in the steps 22 and 23 is carried out to read out only a display color command.

In a case where the read-out command is not a display color command, it is checked whether or not all commands have been read out (step 24). When at least one command is not yet read out, the processing in the step 22 is again carried out, to read the next command out of the display list.

In a case where the read-out command is a display color command, it is checked whether or not the display color command indicates the same color as a color specified by one of picked display color data on the picked display color list (step 25). When the display color command does not correspond to any one of the picked display color data on the picked display color list, the processing in the step 22 is again carried out through the processing in the step 24, to read the next command out of the display list. A display color command indicative of the same color as the color specified by any one of picked display color data on the picked display color list, will hereinafter be referred to as "picked display color command". The above operation is repeated till a picked display color command is read out of the graphic data buffer 5. That is, a plurality of graphic data are successively read out of the display list in such a manner that the display color command and the geometrical form command of each graphic data are separately read out.

The display color command and the geometrical form command are alternately arranged on the display list, that is, the display list includes these commands in the order of a display color command, a geometrical form command, a display color command, a geometrical form command, and so on. A display color command and the next geometrical form command make up one graphic data. In other words, the display color command of graphic data is disposed before the geometrical form command of the same graphic data. In a case where the display color command is read out of the display list and the read-out command is not a picked display color command, the processing in the steps 22, 23, 25 and 24 is carried out to read out the next command. As mentioned above, the next command is a geometrical form command, and hence the processing in the steps 22, 23 and 24.

In a case where the command read out of the display list is a picked display color command, it is checked whether or not all commands have been read out (step 26). The step 26 is necessary for the following reason. As mentioned above, the last command on the display list is a geometrical form command. However, only the display color command of the last graphic data may be stored in the graphic data buffer 5 by mistake. The step 26 is necessary for preventing a mal-function due to the above mistake. The step 24 for a case where a display color command has been read out of the display list, that is, the step 24 following the steps 23 and 25 is necessary for the same reason as above. Further, in order to make it easy to check whether or not all commands have been read out, for example, an end command may be disposed at the end of the display list.

In a case where at least one of the commands on the display list is not yet read out, the next command is read out of the display list (step 27). The next command is to be a geometrical form command. However, since only the display color command of some graphic data may be stored in the graphic data buffer by mistake, it is checked whether or not the next command is a geometrical form command (step 28). When the next command is not a geometrical form command, the next command is a display color command, and it is checked whether or not this display color command is a picked display color command (step 25). In this case, the graphic data having required the processing in the steps 27 and 28 is made up of only the display color command.

When it is judged in the step 28 that the next command is a geometrical form command, the geometrical form command is subjected to coordinate transformation and others, and conventional pattern pick processing necessary for checking whether or not the image data indicates a pattern intersecting with the pick aperture, is carried out (step 29). Then, it is checked whether a pattern to be picked is present or not (step 30).

When the to-be-picked pattern is present, the control processor 4 is informed of that effect, and carries out predetermined processing for forming a modified version of the to-be-picked pattern (step 31). When it is judged in the step 30 that the to-be-picked pattern is absent, the processing in the step 26 is again carried out, to check whether or not all commands have been read out.

As mentioned above, in a case where a two-dimensional pattern is displayed, display color commands of graphic data stored in the graphic data buffer 5 are used for removing graphic data irrelevant to pattern pick processing. That is, only the display color command of each graphic data is used for checking whether or not the graphic data has some connection with pattern pick processing. Thus, the check processing is carried out very rapidly. Further, the number of image data which are checked as to whether or not each image data indicates a pattern intersecting with a pick apertures, is reduced in a great degree, and thus it is possible to speed up pattern pick processing greatly.

Next, explanation will be made of another embodiment of a displayed-pattern picking method according to the present invention, that is, a displayed-pattern picking method which is carried out for an image of a three-dimensional pattern, with reference to FIG. 3. The Z-buffer 11 shown in FIG. 1 is used for a case where a three-dimensional pattern is processed. When an image of a three-dimensional pattern is displayed, a hidden surface of the pattern is removed by using the Z-buffer 11, and an image of the pattern thus processed is displayed. In more detail, when an image of a three-dimensional pattern is displayed, an X-Y-Z coordinate system is set on the display screen 8 so that the Z-direction is the direction of depth from the display screen 8. Before the display color data of a picture element on the surface of a three-dimensional pattern is produced by the graphic processor 6, the graphic processor 6 calculates the depth value (namely, Z-value) of the picture element, and compares the calculated depth value with the depth value of that picture element on the surface of another three-dimensional pattern which has the same X- and Y-values as the former picture element. The depth value of the latter picture element is read out of the Z-buffer 11. When the calculated depth value is smaller than the read-out depth value, the depth value of the latter picture element stored in the Z-buffer 11 is replaced by the calculated depth value. Further, the display color data of the latter picture element is removed from the frame memory 7, and the display color data of the former picture element is produced, to be written in the frame memory 7 in place of the removed display color data. When the calculated depth value is greater than the depth value read out of the Z-buffer 11, the processing for the former picture element terminates, and the processing for the next picture element is carried out. Thus, image data for displaying a portion of a three-dimensional pattern other than a hidden surface, is written in the frame memory 7.

A polyhedral approximation is usually used for expressing a three-dimensional pattern, and a polyhedron is expressed by one of three methods. A first one of the methods is the constant shading method, in which each face of a polyhedron is displayed by a constant color. A second method is the brightness interpolation shading method, in which the brightness of vertices of each face of a polyhedron is first determined, and the brightness of a point on a face is determined by the interpolation method. A third method is the normal interpolation shading method, in which normal vectors at vertices of each face of a polyhedron are first determined, a normal vector at a point on a face is determined by the interpolation method, and the brightness at this point is determined from the reflection of light. In a case where the constant shading method is used, each approximate face has a constant display color. Hence, similarly to a case where a two-dimensional pattern is picked, display color data is read out of the frame memory 7, and used for the speed up of pick processing.

In a case where the brightness interpolation shading method and the normal interpolation shading method are used, the display color may vary greatly on one approximate face. Accordingly, the image data in the frame memory 7 is unusable for the speed up of pick processing.

In each of these methods, in order to remove a hidden surface accurately, the depth value of a point on a face is determined from the depth values of vertices of the face by the linear interpolation method. Accordingly, depth values stored in the Z-buffer 11 can be used for pick processing.

In a case where an image of a three-dimensional pattern is displayed, a viewport set on the display screen 8 indicates a three-dimensional region, and a window indicates a three-dimensional space. A window for a three-dimensional pattern is specifically called "view-volume". In this case, the virtual coordinate system in the graphic data buffer 5 is a three-dimensional coordinate system, and thus each graphic data further includes a depth value in the direction of Z-axis. The depth value of graphic data is converted by the graphic processor 6 into a depth value with respect to a coordinate system on the display screen 8. The latter depth value is stored in the Z-buffer 11, to be used for removing a hidden surface.

In a case where the pattern 9 of FIG. 1 is three-dimensionally displayed on the display screen 8, the depth values of points on the surface of the pattern 9 are stored in the Z-buffer 11, to display the pattern 9 by the hidden surface removal method.

A pick aperture which is sent from the input device 1 to the graphic processor 6, indicates a two-dimensional region on an X-Y plane in the three-dimensional coordinate system set on the display screen 8, and the position mark 10 displayed on the display screen 8 on the basis of the pick aperture indicates a point or two-dimensional region on an X-Y plane is the three-dimensional coordinate system set on the display screen 8.

Figure 3:
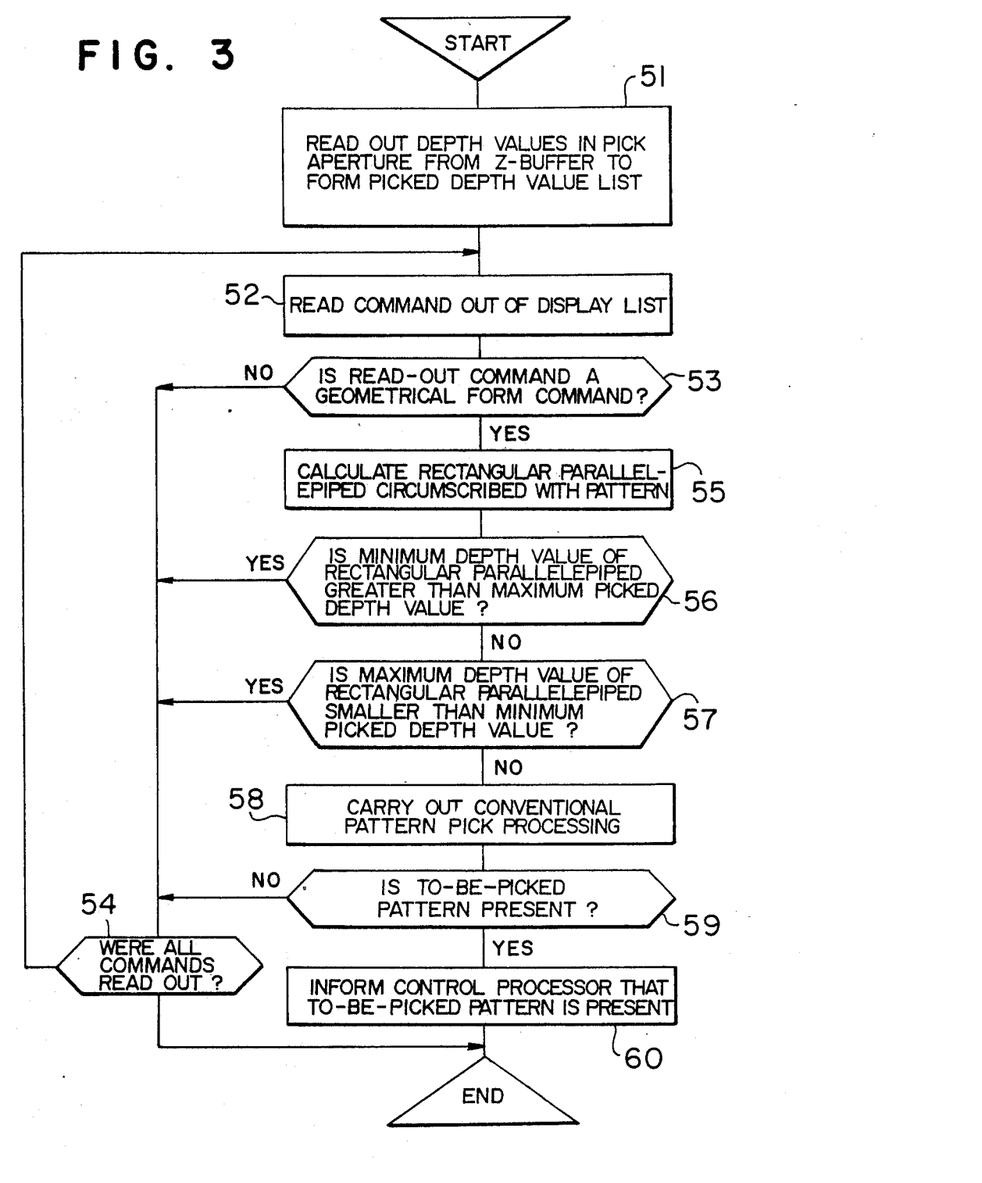
FIG. 3 is a flow chart for explaining another embodiment of a displayed-pattern picking method which is carried out within the system of FIG. 1 in accordance with the present invention.

Referring now to FIGS. 1 and 3, the graphic processor 6 is so formed as to be able to read out a depth value from the Z-buffer 11. When pick aperture data is sent to the graphic processor 6 and pick start indicating data is inputted by the input device 1, the depth values of points on the surface of that portion of the pattern 9 which is contained in a region formed by moving the position mark 10 in the direction perpendicular to the display screen 8, are fetched from the Z-buffer 11 into the graphic processor 6, while using the coordinate values of the pick aperture as address data. The depth values fetched from the Z-buffer 11 will hereinafter be referred as "picked depth values". The graphic processor 6 makes a list (namely, picked depth value list) containing one or more picked depth values (step 51). In the present embodiment, the picked depth value list is made up of a minimum picked depth value and a maximum picked depth value.

Next, a command is read out of the display list in the graphic data buffer 5 (step 52). It is checked whether or not the read-out command is a geometrical form command (step 53). In a case where the read-out command is not a geometrical form command, it is checked whether or not all commands have been read out (step 54). Then, the processing in the step 52 is again carried out, to read out the next command.

When it is judged in the step 53 that the read-out command is a geometrical form command, data indicative of a minimum rectangular parallelepiped which has six faces parallel to an X-Y plane, a Y-Z plane and a Z-X plane and contains a three-dimensional pattern indicated by the geometrical form command, are calculated (step 55).

Next, it is checked whether or not the rectangular parallelepiped intersects with a spatial region defined by the picked depth value list. That is, it is checked whether or not a minimum depth value of the rectangular parallelepiped is greater than the maximum picked depth value on the picked depth value list (step 56), and it is checked whether or not a maximum depth value of the rectangular parallelepiped is smaller than the minimum picked depth value on the picked depth value list (step 57).

In a case where the result of check processing in one of the steps 56 and 57 is "YES", the rectangular parallelepiped does not intersect with the spatial region defined by the picked depth value list, and hence the processing for the geometrical form command terminates. The processing in the step 52 is carried out through the step 52, to read out the next command. In a case where the result of check processing in both of the steps 56 and 57 is "NO", the rectangular parallelepiped intersects with the spatial region defined by the picked depth value list. Accordingly, image data indicative of a three-dimensional pattern is made from the geometrical form command indicative of the pattern inscribed in the rectangular parallelepiped, and conventional pattern pick processing necessary for checking whether or not the image data indicates a pattern intersecting with the pick aperture is carried out (step 58). Then, it is checked whether or not the image data indicates a picture element in the pick aperture, that is, it is checked whether a pattern to be picked is present or not (step 59). When the to-be-picked pattern is present, the control processor 4 is informed of that effect (step 60), and carries out processing for forming an enlarged or modified version of the to-be-picked pattern. When it is judged in the step 59 that the to-be-picked pattern is absent, the processing in the step 52 is again carried out through the step 54, to read out the next command.

As mentioned above, according to the present embodiment for a three-dimensional pattern, depth values of geometrical form commands stored in the graphic data buffer 5 are used for removing graphic data irrelevant to pattern pick processing. That is, only the depth value of each graphic data is used to check whether or not the graphic data has some connection with the pattern pick processing. Thus, the check processing is carried out very rapidly. Further, the number of image data which are checked as to whether or not each image data indicates a pattern intersecting with a pick aperture, is reduced in a great degree, and thus it is possible to speed up pattern pick processing greatly.

We claim:

1. A displayed-pattern picking method used in a graphic display processing system, said system including graphic data buffer means for storing command groups comprising graphic data indicative of display patterns wherein the graphic data includes a display color command and a geometrical form command, an image memory for storing display color data of picture elements displayed on raster-scan type display means, and a graphic processor for reading out the command group from the graphic data buffer means, for calculating display color data corresponding to graphic data within a specified display region, and for writing the calculated display color data in the image memory, said method comprising the steps of:

making a list of specific ones of the display color data stored in the image memory which are included in a specific pattern pick region, by the graphic processor;

comparing display color commands of the graphic data which are successively read out of the graphic data buffer means, with the list by the graphic processor, to select a display color command pattern pick region;

checking whether or not the selected display color command indicates a pattern intersecting with the pattern pick region, by the graphic processor; and,     determining by conventional pick processing whether the geometrical form command associated with the selected display color command comprise graphic data picked for display processing.

2. The displayed-pattern picking method according to claim 1, wherein the checking comprises determining whether or not the display color command corresponds to any one of the display color data on the list.

3. A displayed-pattern picking method used in a graphic display processing system, said system including graphic data buffer means for storing a command group indicative of graphic data, an image memory for storing display color data of picture elements displayed on raster-scan type display means, Z-buffer means for storing the depth values of the picture elements, and a graphic processor for reading out the command group from the graphic data buffer means, for calculating display color data corresponding to graphic data within a specified display region, and for writing the calculated display color data in the image memory, said method comprising the steps of:

making a list of those ones of the depth values stored in the Z-buffer means which are included in a specified pattern pick region, by the graphic processor;

comparing each of commands which are successively read out of the graphic data buffer means, with the depth values on the list by the graphic processor, to select a command which may indicate a pattern intersecting with the pattern pick region; and     checking whether or not the selected command indicates a pattern intersecting with the pattern pick region, by the graphic processor.

4. A graphic display processing system capable of displaying a pattern on the display screen of display means, setting a pattern pick region on the display screen, and displaying one of modified versions of a pattern displayed in the pattern pick region, said system comprising:

graphic data buffer means for storing therein a display list made up of command groups each defining the geometrical form and display color of a pattern;

storage means for storing therein display data with respect to each of picture elements displayed by the display means;

a graphic processor for reading out the display list from the graphic data buffer means to calculate display data corresponding to each graphic data within a specified window and to write the calculated display data in the storage means, the graphic processor including means for reading out display data shown in a pattern pick region on the display screen to make a picked display data list, means for reading out the display list from the graphic data buffer means to compare each graphic data on the display list with the display data on the picked display data list, and means for checking only commands selected by the comparison means as to whether or not each of the selected commands corresponds to a pattern in the pattern pick region;

input means for setting the pattern pick region on the display screen; and     control means for controlling the graphic data buffer means, the storage means, the graphic processor and the input means.

5. A graphic display processing system according to claim 4, wherein the display data stored in the storage means is display color data with respect to each of the picture elements.

6. A graphic display processing system according to claim 5, wherein the comparison means included in the graphic processor compares each command on the display list for defining the display color of a pattern, with display color data on the picked display data list.

7. A graphic display processing system according to claim 4, wherein an image of a three-dimensional pattern is displayed on the display screen, and wherein the storage means includes an image memory for storing display color data with respect to each of the picture elements and a depth value buffer for storing a depth value with respect to each picture element.

8. A graphic display processing system according to claim 7, wherein the means for making the picked display data list makes a picked depth value list for showing depth values with respect to a pattern displayed in the pattern pick region, and the comparison means compares a depth value which is obtained from each command on the display list for defining the geometrical form of a pattern with the depth values on the picked depth value list.

9. A graphic display processing system according to claim 8, wherein the picked depth value list is made up of a maximum depth value and a minimum depth value in the pattern pick region.

10. A graphic display processing system according to claim 9, wherein the comparison means compares a minimum depth value obtained from commands each for defining the geometrical form of a pattern with a maximum depth value on the picked depth value list, and compares a maximum depth value obtained from commands each for defining the geometrical form of a pattern with a minimum depth value on the picked depth value list.

11. A graphic display processing system capable of displaying patterns on a display screen, setting a pattern pick region on the display screen, and displaying a modified version of the pattern displayed in the pattern pick region, the system comprising:

a graphic data buffer for storing therein graphic data made of command groups corresponding to the displayed pattern, each of said command groups defining a geometrical form and display color of each of the displayed pattern;

a frame memory for storing therein display data with respect to each of picture elements displayed on the display screen;

an input device for setting the pattern pick region on the display screen;

first means for reading out said display data corresponding to said picture elements displayed in the pattern pick region on the display screen from said frame memory so as to make a picked display data list; and, second means for reading out said graphic data from said graphic data buffer and comparing each of said graphic data with said display data of said picked display data list so as to select said command groups corresponding to the pattern displayed in the pattern pick region.

12. The system according to claim 11 further comprising third means for checking only said command groups selected by said second means, as to whether or not each of said selected command groups corresponds to the pattern in the pattern pick region.

* * * * *